(12) United States Patent
Ji et al.

(10) Patent No.: US 8,619,653 B2
(45) Date of Patent: Dec. 31, 2013

(54) SYSTEM AND METHOD FOR PRESERVING BATTERY LIFE FOR A MOBILE STATION

(75) Inventors: Baowei Ji, Plano, TX (US); Farooq Khan, Allen, TX (US); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 12/592,408

(22) Filed: Nov. 24, 2009

(65) Prior Publication Data
US 2010/0302980 A1 Dec. 2, 2010

Related U.S. Application Data

(60) Provisional application No. 61/217,218, filed on May 27, 2009.

(51) Int. Cl.
*H04W 72/00* (2009.01)

(52) U.S. Cl.
USPC .......................................................... 370/311

(58) Field of Classification Search
USPC .......................................................... 370/311
See application file for complete search history.

(56) References Cited

U.S. PATENT DOCUMENTS

| 5,870,685 | A * | 2/1999 | Flynn ............................ 455/573 |
| 6,560,453 | B1 * | 5/2003 | Henry et al. ................ 455/67.11 |
| 6,697,617 | B2 | 2/2004 | Liebenow |
| 7,583,984 | B2 * | 9/2009 | Sun et al. ...................... 455/572 |
| 2006/0079268 | A1 | 4/2006 | Livet et al. |
| 2008/0020808 | A1 * | 1/2008 | Wang et al. ................... 455/574 |
| 2008/0049653 | A1 * | 2/2008 | Demirhan et al. ............ 370/311 |
| 2008/0133956 | A1 * | 6/2008 | Fadell ............................ 713/340 |
| 2008/0311961 | A1 * | 12/2008 | Cotevino et al. ............. 455/574 |
| 2009/0098914 | A1 * | 4/2009 | Martin-Cocher et al. .... 455/572 |
| 2010/0002612 | A1 * | 1/2010 | Hsu et al. ...................... 370/311 |
| 2010/0317345 | A1 | 12/2010 | Futaki et al. |

FOREIGN PATENT DOCUMENTS

| JP | 04-304721 | 10/1992 |
| JP | 08-172671 | 7/1996 |
| JP | 08-181652 | 7/1996 |
| JP | 10-135893 | 5/1998 |
| JP | 11-068642 | 3/1999 |
| JP | 2003-512777 A | 4/2003 |
| JP | 2006520170 | 8/2006 |
| JP | 2008-278325 | 11/2008 |

(Continued)

OTHER PUBLICATIONS

International Search Report dated Dec. 21, 2010 in connection with PCT Application No. PCT/KR2010/003299.

(Continued)

*Primary Examiner* — Sulaiman Nooristany

(57) ABSTRACT

A mobile station capable of accessing a wireless communication network having a plurality of base stations is provided. The mobile station is configured to determine if a battery level of the mobile station is below a selected one of a plurality of power level thresholds. The mobile station is also configured to, upon a determination that the battery level is below the selected power level threshold, send a battery report to a first base station of the wireless communication network. The mobile station is further configured to enter a battery power preservation mode. The battery power preservation mode may include an enhanced idle mode, an enhanced sleep mode, or a persistent allocation mode.

21 Claims, 13 Drawing Sheets

(56) References Cited

FOREIGN PATENT DOCUMENTS

| | | |
|---|---|---|
| JP | 2009-505483 | 2/2009 |
| KR | 1020060082912 A | 7/2006 |
| KR | 1020060120809 A | 11/2006 |
| KR | 1020070081178 A | 8/2007 |
| KR | 1020080097717 A | 11/2008 |
| WO | WO 2008096685 A1 | 8/2008 |

OTHER PUBLICATIONS

Translated Examination Report dated Sep. 3, 2013 in connection with Japanese Patent Application No. 2012-512960; 7 pages.

* cited by examiner

SYSTEM AND METHOD FOR PRESERVING BATTERY LIFE FOR A MOBILE STATION

CROSS-REFERENCE TO RELATED APPLICATION(S) AND CLAIM OF PRIORITY

The present application is related to U.S. Provisional Patent Application No. 61/217,218, filed May 27, 2009, entitled "METHOD FOR PRESERVING BATTERY LIFE FOR A MOBILE STATION". Provisional Patent Application No. 61/217,218 is assigned to the assignee of the present application and is hereby incorporated by reference into the present application as if fully set forth herein. The present application hereby claims priority under 35 U.S.C. §119(e) to U.S. Provisional Patent Application No. 61/217,218.

TECHNICAL FIELD OF THE INVENTION

The present application relates generally to rechargeable batteries and, more specifically, to methods for preserving the life of a battery in a mobile station.

BACKGROUND OF THE INVENTION

Battery life is critical for portable and mobile devices to maintain connections over the air. There are examples in prior art ad hoc and mesh networks where devices elect to contribute to the connections of the network based on their battery level. For example, a device with sufficient battery life could volunteer to act as a wireless router or relay station to help a device with limited battery life. This is typically not the case for cellular network topology, where each mobile station is connected to a base station in active mode, or monitoring a base station in idle mode. Traditionally, a mobile station's battery level did not play a significant role in the scheduling and resource allocations in cellular communication. Among many drawbacks, one problem is that a mobile station could run out of power quickly.

SUMMARY OF THE INVENTION

A mobile station capable of accessing a wireless communication network having a plurality of base stations is provided. The mobile station is configured to determine if a battery level of the mobile station is below a selected one of a plurality of power level thresholds. The mobile station is also configured to, upon a determination that the battery level is below the selected power level threshold, send a battery report to a first base station of the wireless communication network. The mobile station is further configured to enter a battery power preservation mode.

A base station in a wireless communication network is provided. The base station is configured to receive a battery report from a mobile station. The base station is also configured to determine if the mobile station is eligible to enter a battery power preservation mode. The base station is further configured to, upon a determination that the mobile station is eligible to enter the battery power preservation mode, enter the battery power preservation mode for the mobile station.

A wireless communication network comprising a plurality of base stations is provided. Each base station in the wireless communication network is configured to receive a battery report from a mobile station. Each base station is also configured to determine if the mobile station is eligible to enter a battery power preservation mode. Each base station is further configured to, upon a determination that the mobile station is eligible to enter the battery power preservation mode, enter the battery power preservation mode for the mobile station.

Neighbor base stations may work together to support the battery power preservation mode for the mobile station during handover, network reentry and other operations that involve multiple base stations. A central controller (e.g., paging controller) may be involved in the core network to support the battery power preservation mode for the mobile station during idle mode, paging and other operations that involves the core network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile station and wireless communication network.

The following documents and standards descriptions are hereby incorporated into the present disclosure as if fully set forth herein:

IEEE C802.16m-09/0777, Proposed amendment text on IEEE 802.16m power management for connected mode, April 2009 (hereinafter "the 0777 reference"); and IEEE C802.16m-09/1136r2, Proposed text for the MAC procedure for DL and UL persistent allocation in the IEEE 802.16m amendment, May 2009 (hereinafter "the 1136r2 reference").

New contributions to the IEEE 802.16m standard propose to have a mobile station report its battery level to a base station when the mobile station supports power management in connected mode and its battery level goes below a certain threshold. However, it is difficult to define a single battery level that is appropriate for all mobile stations because each device may be of a different type, and the same battery level may mean different situations for different mobile devices. Another drawback is the lack of specification on what the base station should do in response to the battery level report.

The systems and methods of the present disclosure are provided to preserve the battery life of a mobile handset. (A mobile handset is also known as a mobile device, a mobile station, or a subscriber station. These terms will be used interchangeably throughout this disclosure.) The systems and methods disclosed herein inform the associated base station about the battery life of the mobile station relative to its current operational state, and allow the base station to help preserve the mobile station battery while minimizing the impact on regular communication and emergency calls.

Figure 1:
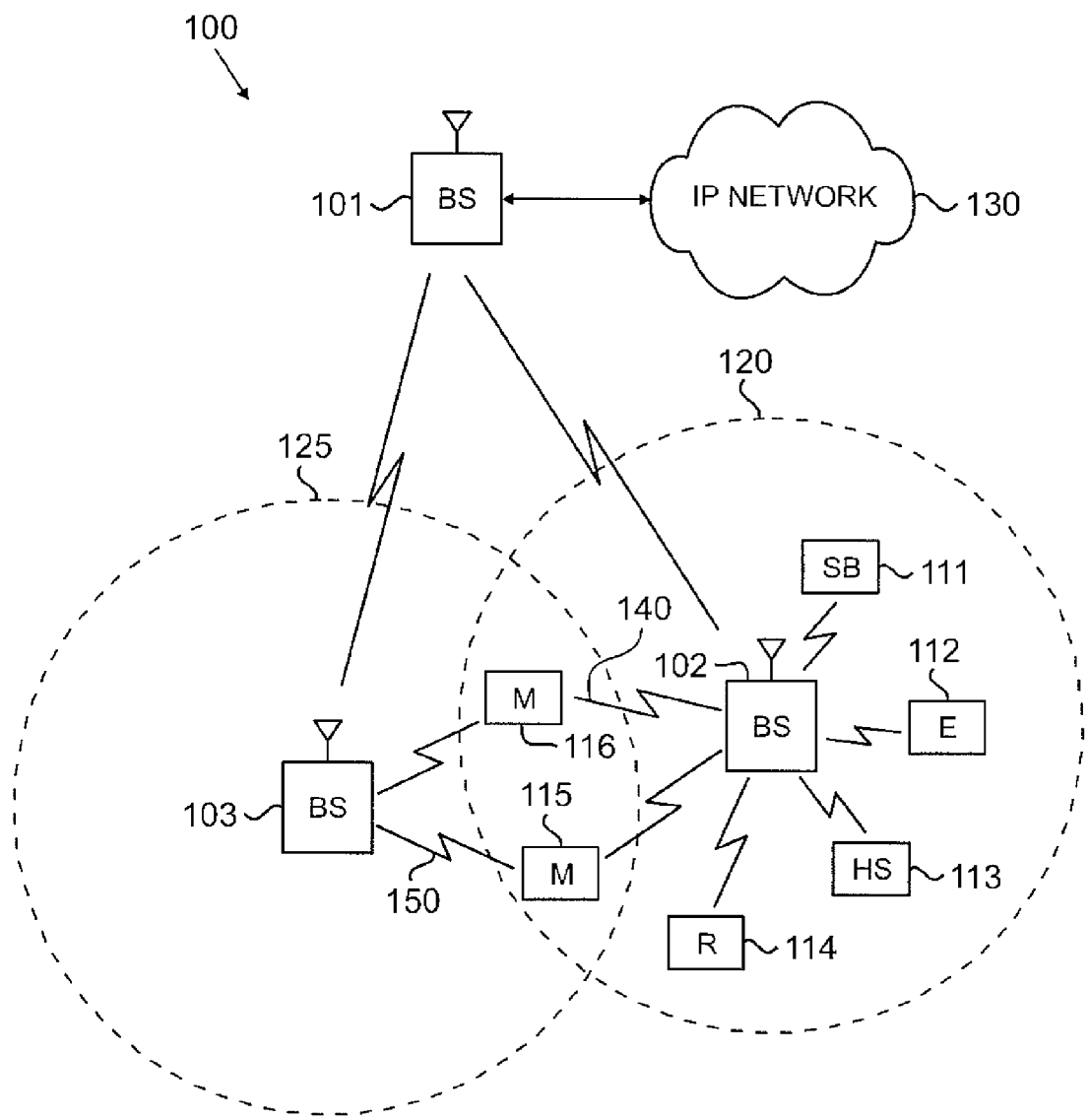
FIG. 1 illustrates an exemplary wireless network 100 according to one embodiment of the present disclosure.

FIG. 1 illustrates an exemplary wireless network 100 according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Figure 2:
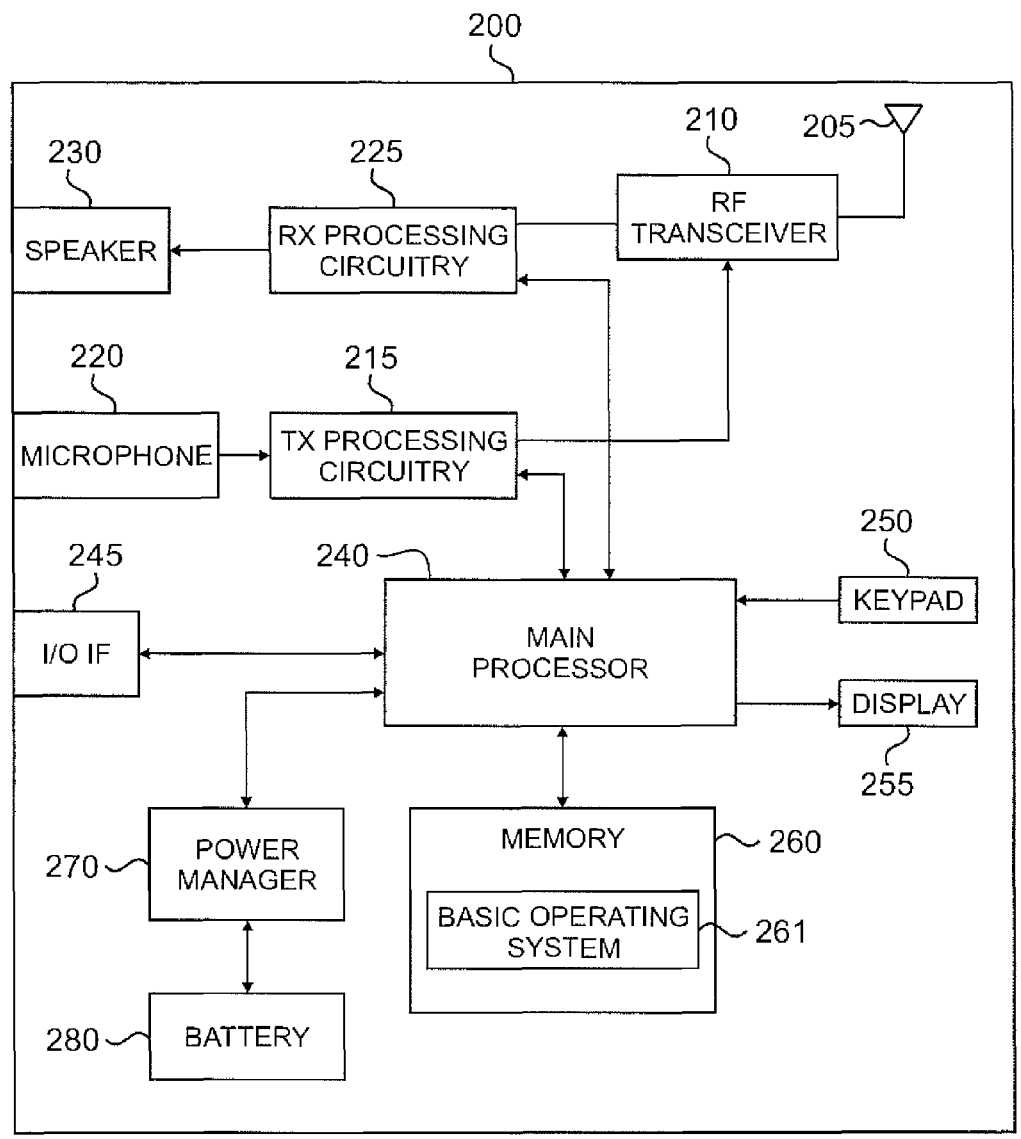
FIG. 2 illustrates a wireless mobile station 200 according to embodiments of the present disclosure.

FIG. 2 illustrates a wireless mobile station 200 according to embodiments of the present disclosure. In certain embodiments, wireless mobile station 200 may represent any of the subscriber stations 111-116 shown in FIG. 1. The embodiment of wireless mobile station (MS) 200 illustrated in FIG. 2 is for illustration only. Other embodiments of wireless mobile station 200 could be used without departing from the scope of this disclosure.

Wireless mobile station 200 comprises antenna 205, radio frequency (RF) transceiver 210, transmit (TX) processing circuitry 215, microphone 220, and receive (RX) processing circuitry 225. Mobile station 200 also comprises speaker 230, main processor 240, input/output (I/O) interface (IF) 245, keypad 250, display 255, memory 260, power manager 270, and battery 280.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. Memory 260 can be any computer readable, medium. For example, memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of mobile station 200. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides mobile station 200 with the ability to connect to other devices such as laptop computers and handheld computers. I/O interface 245 is the communication path between these accessories and main controller 240.

Main processor 240 is also coupled to keypad 250 and display unit 255. The operator of mobile station 200 uses keypad 250 to enter data into mobile station 200. Display 255 may be a liquid crystal or light emitting diode (LED) display capable of rendering text and/or graphics from web sites. Alternate embodiments may use other types of displays.

As illustrated in FIG. 2, power manager 270 monitors the battery consumption of battery 280 in real time and interacts with other units in mobile station 200, as well as the serving base station and core network when necessary in order to prolong the life of mobile station 200 when it is not plugged in an AC supply.

In order to fairly support multiple types of mobile devices, the network and/or the base station shall define a power level threshold for each type of mobile device. Each power level threshold corresponds to a battery level below which battery preservation methods occur. Even for the same physical device, different thresholds may be defined for various modes of usage.

For example, in advantageous embodiments, T_video may be defined as the power level threshold for a mobile device in video usage mode. Likewise, T_voice and T_data may be defined for voice and data call mode, respectively. Because video usage typically consumes more power than voice calls, the value of T_video should be higher than that of T_voice to preserve the battery life for the same amount of time. Similarly, the value of T_voice might be larger than that of T_data for preserving the same amount of time. In certain embodiments, a mobile station may report not only the battery level, but also the device type when its battery level goes below the threshold defined for its type of device.

Referring to mobile station 200 shown in FIG. 2, power manager 270 interfaces with battery 280 and main processor 240 in order to compare the current battery level against the threshold predetermined for the device type. When the battery level is equal or less than the threshold, it will send a battery report to the serving base station and/or the core network.

Figure 3:
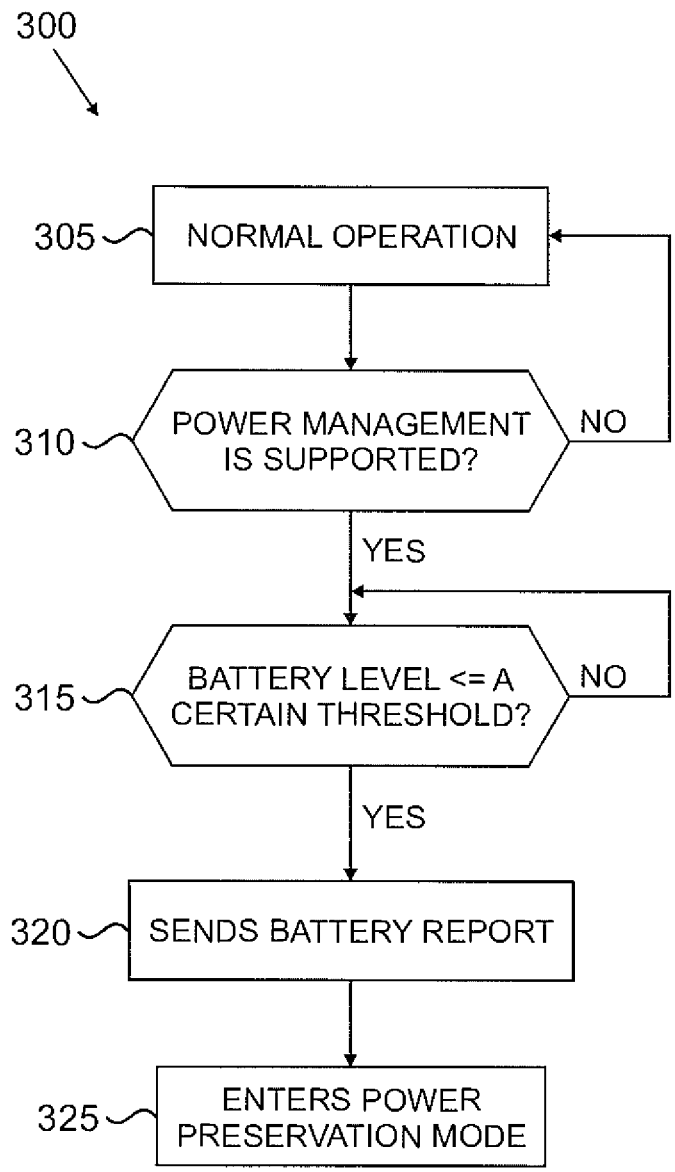
FIG. 3 depicts a flow chart illustrating a battery life preservation method, according to one embodiment of the present disclosure.

FIG. 3 depicts a flow chart illustrating a battery life preservation method, according to one embodiment of the present disclosure. Method 300 may be used when a mobile station (e.g., mobile station 200) is in a normal operation mode. The term "normal operation" is used in this disclosure to distinguish from a power preservation mode. In certain embodiments, normal operation modes may include connected mode, idle (or de-registered) mode, sleep mode, and active mode. Other operation modes of mobile station 200 may also be considered normal operation modes. The figures and methods disclosed herein apply for any of the normal operation modes, unless otherwise described.

Method 300 starts in normal operation mode (step 305). It is determined if mobile station 200 is currently configured to support power management methods to preserve battery life (step 310). If mobile station 200 is not currently configured to support power management, then mobile station 200 stays in normal operation mode without power management. On the other hand, if mobile station 200 is currently configured to support power management, then mobile station 200 will continually check the power level of battery 280 to determine if the battery level is below a certain predetermined threshold (step 315).

As described above, the threshold level is determined by the mode of usage of mobile station 200. For example, if mobile station 200 is in video usage mode, the threshold level may be T_video. If the power level of battery 280 is above the predetermined threshold, then no action is taken. Mobile station 200 will continue to monitor the power level of battery 280. On the other hand, if the power level of battery 280 is at or below the threshold level, then mobile station 200 sends a battery report to the base station (step 320).

The battery report contains information related to mobile station 200 and the status of battery 280. For example, in certain embodiments, the battery report may contain the current power level of battery 280, the operation mode (e.g., connected, idle, sleep, etc.) of mobile station 200, the mode of usage (e.g., video, voice call, data call, etc.) of mobile station 200, a traffic classification, the desired mode of power preservation (or battery protection), and the amount of time that the power preservation mode should be enacted. The power preservation modes are described below in greater detail.

After sending the battery report to the base station, mobile station 200 then enters the designated power preservation mode (step 325). Mobile station 200 will remain in power preservation mode for a certain period of time, or until the power level of battery 280 is above the current threshold level. This may be due to a charging of battery 280, or a decrease in the current threshold level (e.g., due to a change in the mode of usage). Power preservation mode is described below in greater detail.

Figure 4:
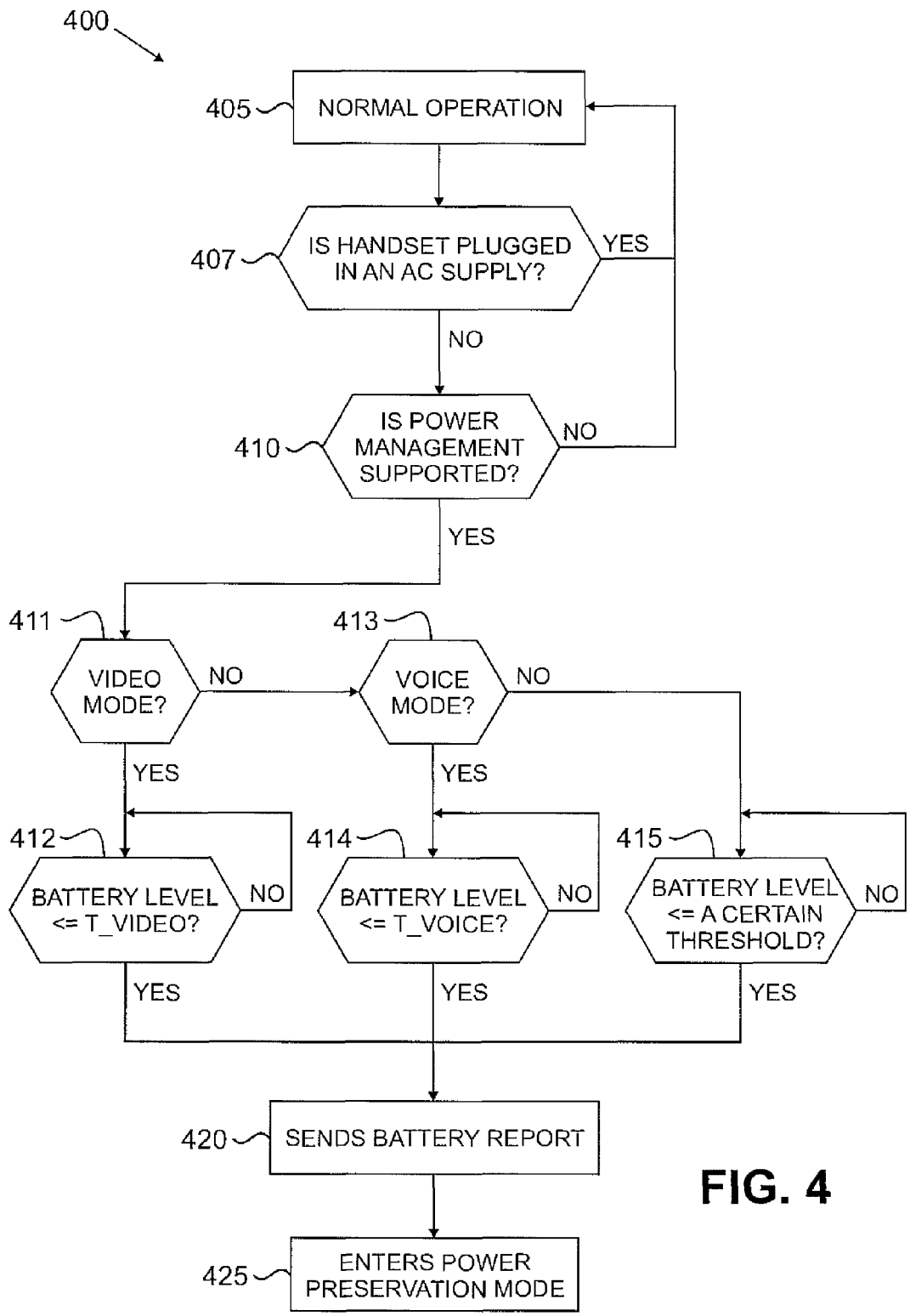
FIG. 4 depicts a flow chart illustrating a battery life preservation method in greater detail, according to one embodiment of the present disclosure.

FIG. 4 depicts a flow chart illustrating battery life preservation method in greater detail, according to one embodiment of the present disclosure. In certain embodiments, method 400 may represent a more detailed embodiment of method 300. Method 400 may be used when a mobile station (e.g., mobile station 200) has the cognitive ability to know of its device status and mode of usage and report the battery level accordingly.

Method 400 starts in normal operation mode (step 405). It is determined if mobile station 200 is currently plugged into a power outlet (step 407). If mobile station 200 is plugged into a power outlet and is being charged, it does not send a new battery report (except, for example, a message to cancel a previous battery report), even if the current power level is below a certain threshold. On the other hand, if mobile station 200 is not currently plugged into a power outlet, then the method continues to step 410.

At step 410, it is determined if mobile station 200 is currently configured to support power management methods to preserve battery life. If mobile station 200 is not currently configured to support power management, then mobile station 200 stays in normal operation mode without power management. On the other hand, if mobile station 200 is currently configured to support power management, then mobile station 200 will compare the power level of battery 280 against different thresholds depending on whether mobile station 200 is in video mode (steps 411 and 412), voice mode (steps 413 and 414), or another mode (step 415). If the power level of battery 280 is at or below the specific threshold level, then mobile station 200 sends a battery report to the base station (step 420).

For example, assume mobile station 200 has a battery level between T_video and T_voice. In this case, mobile station 200 may not send a battery report if it is operating in voice call mode only, because its battery level is above T_voice. On the other hand, the same device would report its battery level if it is currently operating in video mode because its battery level is below T_video.

After sending the battery report to the base station, mobile station 200 then enters the designated power preservation mode (step 425).

Figure 5:
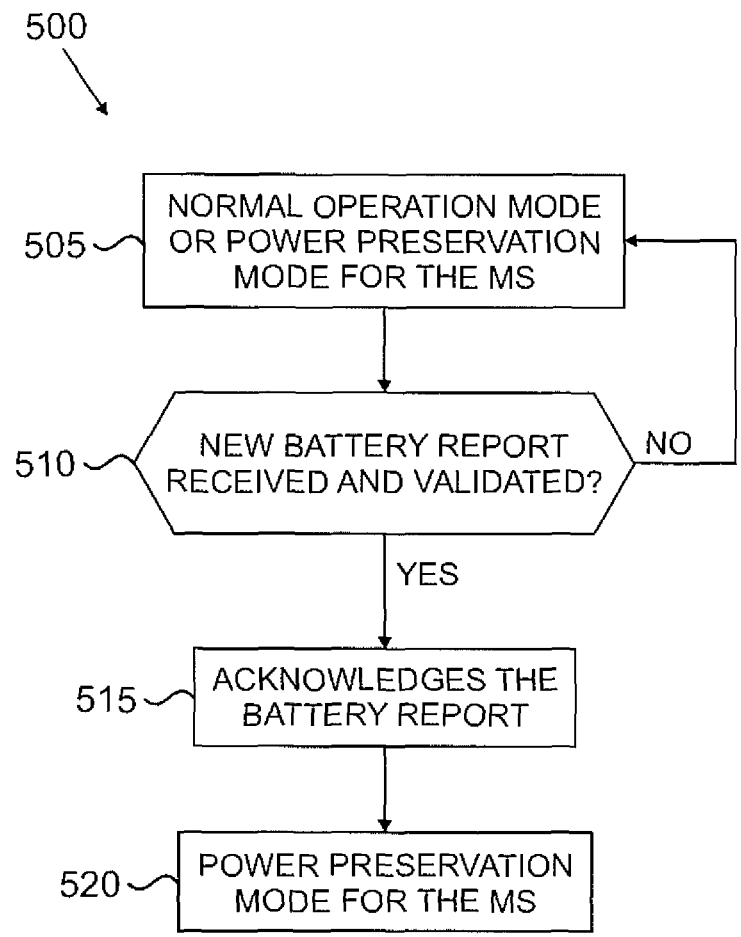
FIG. 5 depicts a flow chart illustrating a method for a base station to acknowledge a battery report from the mobile station, according to one embodiment of the present disclosure.

FIG. 5 depicts a flow chart illustrating a method for a base station to acknowledge a battery report from the mobile station, according to one embodiment of the present disclosure. This method provides reduced power consumption for mobile station 200, even when sending the battery report.

Method 500 starts with mobile station 200 in either normal operation mode or power preservation mode (step 505). A base station (e.g., base station 102) that is communication with mobile station 200 determines if a new battery report is received from mobile station 200 (step 510). If base station 102 does not receive a new battery report from mobile station 200, then base station 102 will continue to check for a new battery report.

On the other hand, if base station 102 receives a new battery report from mobile station 200, then base station 102 may validate the mobile station requirement with a certain entity in the core network, and acknowledge the battery report immediately or at least within a certain time period so that mobile station 200 does not have to report several times (step 515). In certain embodiments, base station 102 may keep the mobile station report in record so that mobile station 200 does not have to report periodically as long as mobile station 200 is connected to base station 102. Base station 102 should also inform the core network so that mobile station 200 does not have to send a new battery report even if it is moving into a different cell. If the new base station (e.g., base station 103) is not aware of the situation, however, mobile station 200 should send the battery report to the new base station in order to get enhanced service for preserving the battery.

After base station 102 acknowledges the battery report, then mobile station 200 enters power preservation mode (step 520).

Figure 6:
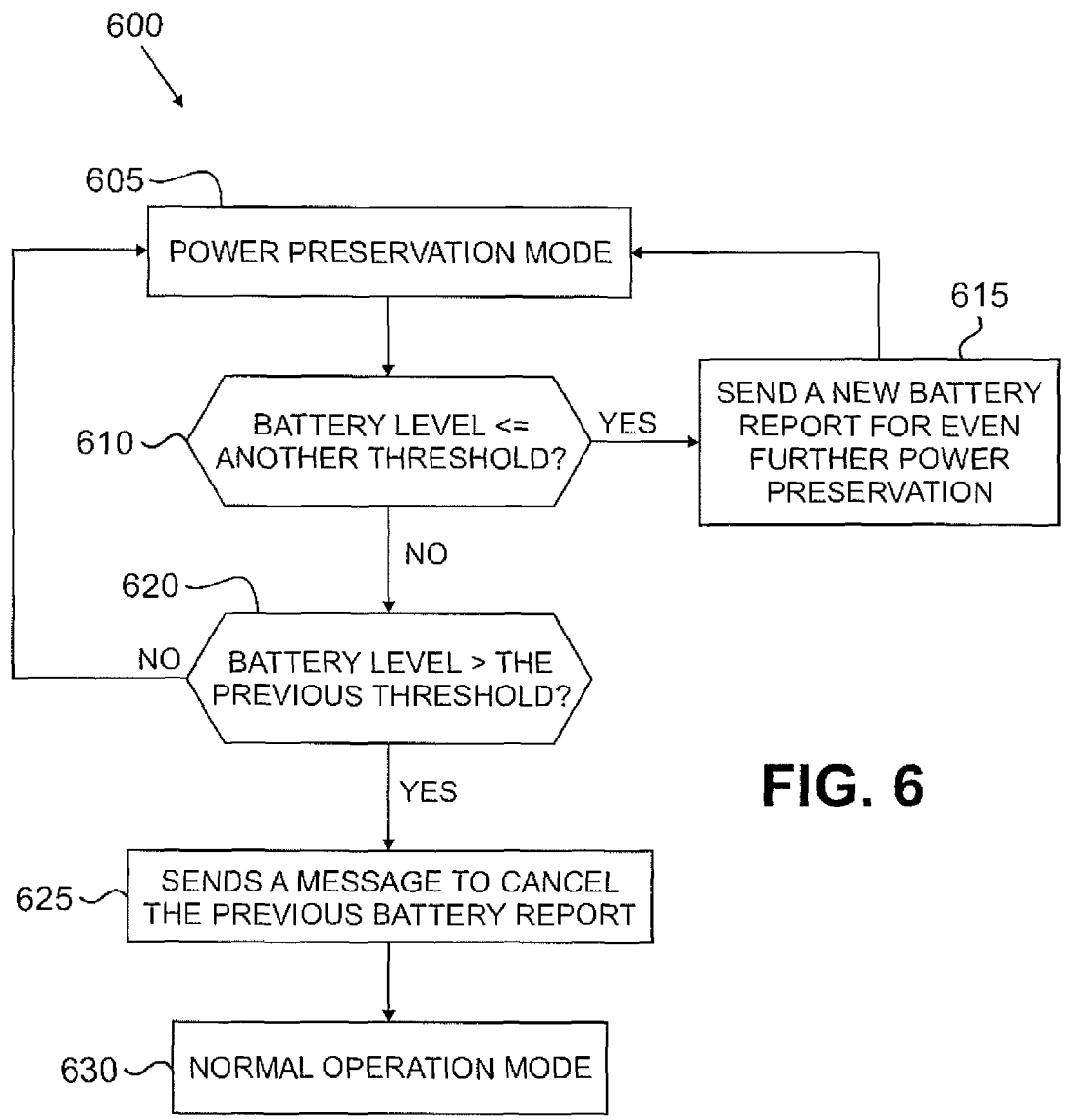
FIG. 6 depicts a flow chart illustrating a method for managing battery reports, according to one embodiment of the present disclosure.

FIG. 6 depicts a flow chart illustrating a method for managing battery reports, according to one embodiment of the present disclosure. Method 600 may be used when a mobile station's battery level has moved to a new threshold, or when the mobile station is plugged into a charger.

Method 600 starts with mobile station 200 in a power preservation mode (step 605). In certain embodiments, mobile station 200 entered the power preservation mode because its battery level fell below a first threshold. Mobile station 200 determines if its current battery level is less than or equal to a second threshold that is smaller than the first threshold (step 610). If so, mobile station 200 could send a new battery report describing its battery level below the second threshold (step 615). The new battery report may request the base station to provide additional preservation services to mobile station 200 to prolong the mobile station's battery life.

On the other hand, if the current battery level in mobile station 200 is not less than or equal to a second threshold, then mobile station 200 determines if its current battery level is now greater than the first threshold (step 620). If it is not, then mobile station 200 stays in power preservation mode.

On the other hand, if the current battery level has risen to be greater than the first threshold (e.g., mobile station 200 is plugged into a charger and is charging), then mobile station 200 sends a message to the base station cancelling the previous battery report (step 625). Mobile station 200 then enters normal operation mode (step 630). Once this occurs, the base station could treat mobile station 200 as a normal mobile device without constraints on scheduling or other issues. This allows the base station to treat all mobile stations fairly, namely avoiding offering a mobile station undue support when the mobile station battery level is above a certain threshold.

Similarly, if the current battery level has risen to be greater than the second threshold but still below the first threshold and mobile station 200 is not plugged into a charger, then mobile station 200 sends a message to the base station cancelling the battery report regarding the second threshold. In this case, mobile station 200 remains in power preservation mode in the first threshold level rather than the second threshold level.

It is important for the base station to treat every mobile station fairly and avoid offering undue battery preservation services to a mobile station with sufficient battery life. As soon as a mobile station has sent a battery report and requested or required the base station to use enhanced methods to preserve the mobile station battery, the base station should start a timer for this mobile station. In some embodiments, the timer might be managed by the core network. The base station (or core network) may stop using the enhanced methods for preserving the mobile station battery when the timer expires.

In certain embodiments, the timer may be designed to correspond to an estimate of the maximum possible time period the mobile station could still stay alive given the reported battery life. The value of the timer may consider different operation scenarios of the mobile station, e.g., the mobile station could stay alive much longer in idle mode than in active mode. Thus, the timer may start with less time while the mobile station is in active mode than when it is in idle mode. The timer may be stopped when the mobile station cancels the current battery report.

If the mobile station is still alive after the timer expires, the network may mark the mobile station as having abused the power preservation service. When a mobile station sends a battery report, the base station (or other network resource) may check against a database in the core network to see whether the mobile station has abused the power preservation service before. The base station may then decide whether to provide further enhanced services for preserving the battery life for this mobile station.

Figure 7:
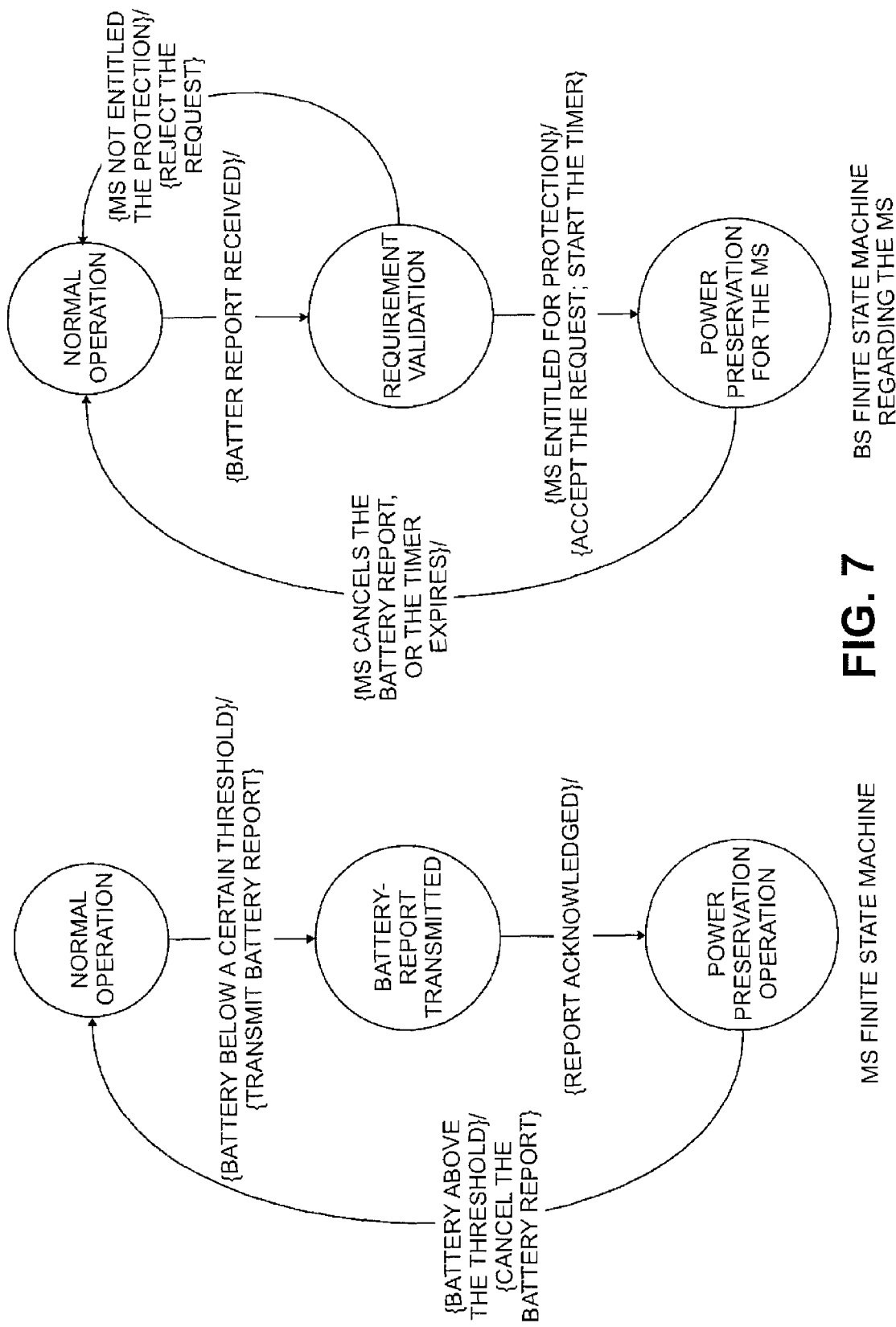
FIG. 7 illustrates finite state machines for a mobile station and a base station in response to a battery report, according to one embodiment of the present disclosure.

FIG. 7 illustrates finite state machines for a mobile station and a base station in response to a battery report, according to one embodiment of the present disclosure. In each path, the text before the '/' symbol represents the condition, and the text after the '/' symbol represents the action to take before transitioning to the next state. For example, the mobile station continuously monitors its battery level against a certain threshold defined for the device type it currently belongs to. If the battery level is below the threshold, the mobile station sends a battery report and waits for acknowledgment from the base station. The mobile station may re-transmit the report if no response is received from the base station after a certain time. The base station may validate the mobile station request after receiving the battery report from the mobile station. If the mobile station is entitled to power preservation services, the base station should adjust its operation in order to help the mobile station preserve the battery. Otherwise, the base station may cancel the request.

Figure 8:
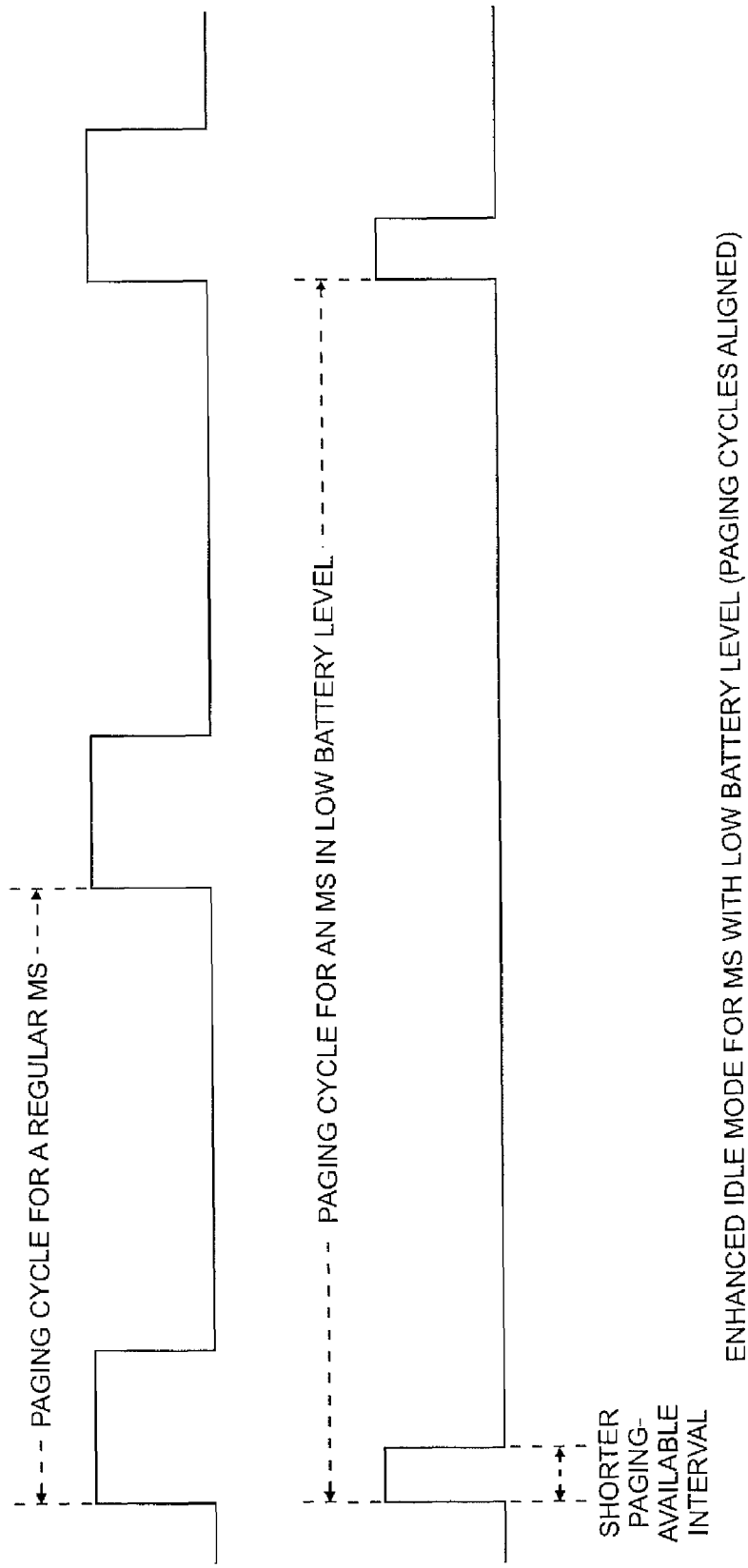
FIGS. 8 and 9 depict paging cycles for a mobile station in enhanced idle mode, according to embodiments of the present disclosure.
Figure 9:
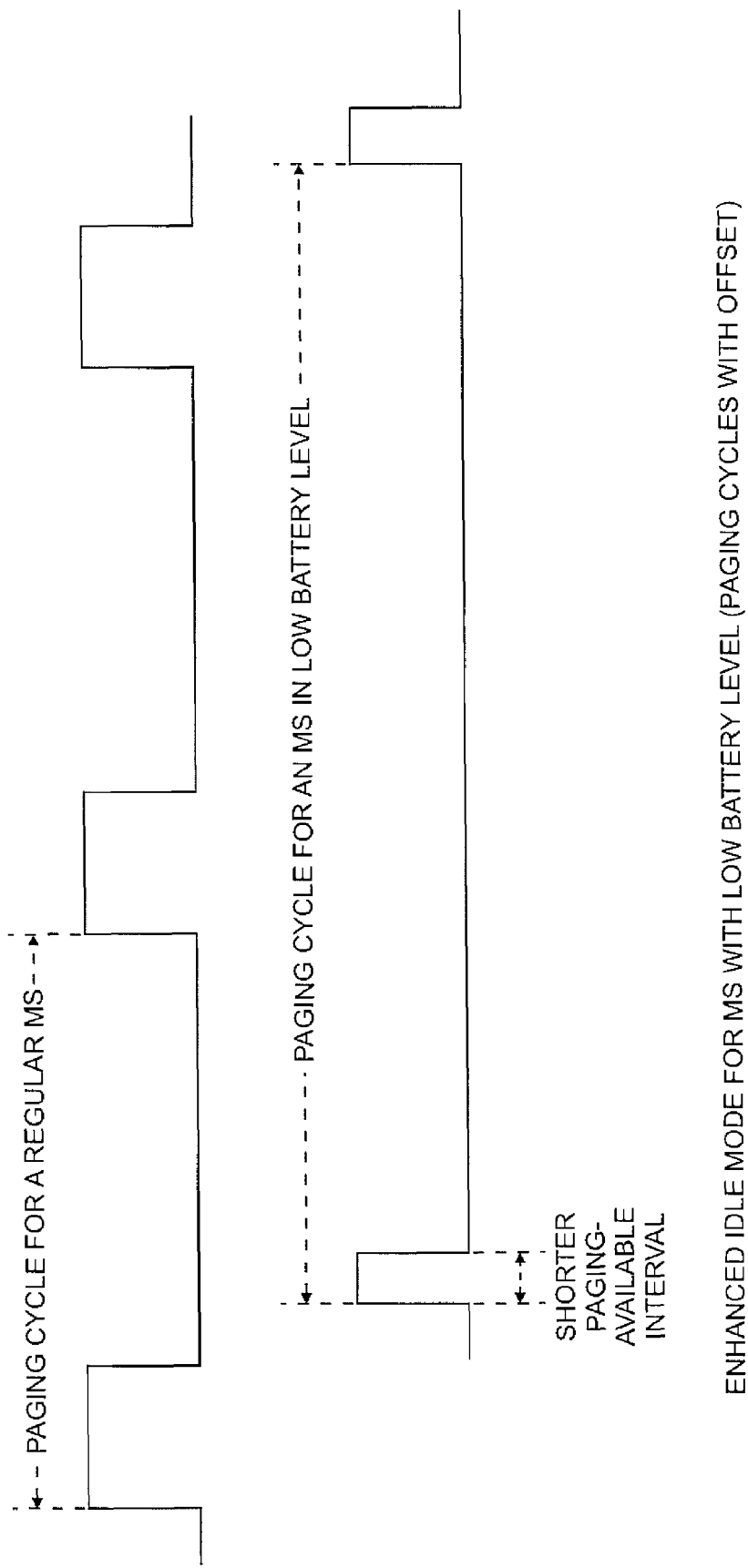

FIGS. 8 and 9 depict paging cycles for a mobile station in enhanced idle mode, according to embodiments of the present disclosure. FIGS. 8 and 9 compare a paging cycle for a mobile station having an adequate battery level with a paging cycle for a mobile station having a low battery level. In FIG. 8, the paging cycles are aligned. In FIG. 9, the paging cycles are offset. The figures illustrate that a mobile station having a low battery level uses longer paging cycles and smaller available intervals during each paging cycle for better preserving battery life.

In certain embodiments, the mobile station may enter enhanced idle mode after the mobile station has sent a battery report to the base station. If the mobile station is entitled to power preservation services, the network may specify a paging cycle for the mobile station during the idle mode negotiation. This paging cycle is different from the paging cycle definition for a normal mobile station, where the paging cycle typically starts with an initial paging cycle length, and doubles each time the mobile station is not paged until the paging cycle reaches the maximum paging cycle. In other words, the network may request that the mobile station use the maximum paging cycle from the beginning in order to further preserve the mobile station power consumption.

Each paging cycle includes an available interval for the mobile station to monitor any paging message, and an unavailable interval so that the mobile station goes back to idle if it is not paged in the available interval. In order to preserve battery power, the network may assign an available interval for each paging cycle that is shorter that the available interval for a normal mobile station that has not sent battery report.

The embodiments shown in FIGS. 8 and 9 may also be applicable for a sleep mode with appropriate parameters of sleep cycle, listening window and sleep window.

Figure 10:
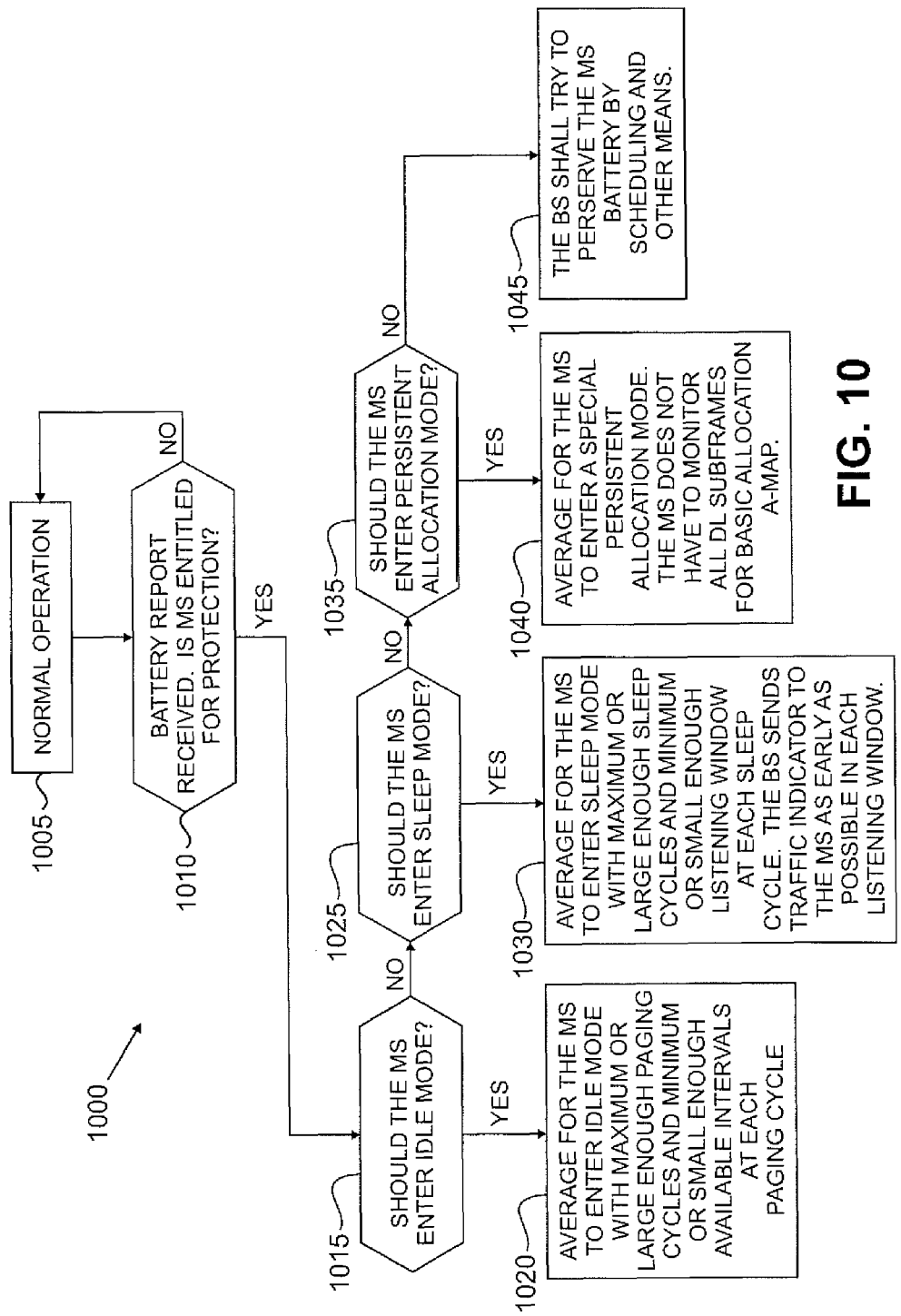
FIG. 10 depicts a flow chart illustrating a method for a base station to preserve the battery life of a mobile station, according to embodiments of the present disclosure.

FIG. 10 depicts a flow chart illustrating a method for a base station (e.g., base station 102) to preserve the battery life of a mobile station (e.g., mobile station 200), according to embodiments of the present disclosure. Method 1000 starts with mobile station 200 in normal operation mode (step 1005). Next, upon detecting a low battery level (i.e., below a certain threshold), mobile station 200 sends a battery report that is received by base station 102 (step 1010). Base station 102 determines if mobile station 200 is entitled to enhanced battery preservation services. Base station 102 also determines the appropriate battery preservation service to employ, based at least in part on the battery level. If mobile station 200 is not entitled to enhanced battery preservation services (e.g., due to lack of available services in the network or earlier abuse by mobile station 200), then mobile station 200 continues in normal operation.

On the other hand, if mobile station 200 is entitled to enhanced services, then it is determined if mobile station 200 should enter idle mode (step 1015). If it is determined that mobile station 200 should enter idle mode, then base station 102 arranges for mobile station 200 to enter idle mode and specifies a paging cycle with smaller available intervals, such as described earlier with respect to FIGS. 8 and 9 (step 1020).

On the other hand, if mobile station 200 should not enter idle mode (e.g., due to an ongoing data connection), then it is determined if mobile station 200 should enter sleep mode (step 1025). If it is determined that mobile station should enter sleep mode, then base station 102 assigns an enhanced sleep mode for mobile station 200 (step 1030). The enhanced sleep mode is different from the regular sleep mode as seen in the prior art.

In prior art sleep modes, a mobile station typically starts from an initial sleep cycle, then doubles the length of the sleep cycle when there is no traffic in the previous cycle until it reaches the maximum sleep cycle length. Each sleep cycle includes a listening window and a sleep window. The listening window of the current sleep cycle is extendable depending on whether there is traffic in the beginning of the current sleep cycle. The remaining part of the current sleep cycle is the sleep window.

In one embodiment of the enhanced sleep cycle, base station 102 may assign a listening window (or interval) that is a minimum width or narrower than the default listening window for a normal mobile station. This will shorten the awake time for mobile station 200 in each sleep cycle so that the power consumption may be further reduced. In some embodiments, base station 102 may send a negative traffic indicator in the listening window, so that mobile station 200 can switch to the sleep window immediately in the current sleep cycle.

However, if mobile station 200 has sent a battery report and is entitled to further power management, base station 102 may broadcast the negative indicator to mobile station 200 as early as possible if there is not data buffered for mobile station 200, so that mobile station 200 could switch to sleep mode immediately. This may better preserve the battery life in sleep mode operation.

Returning now to step 1025, if it is determined that mobile station 200 should not enter sleep mode, then it is determined if mobile station 200 should enter a persistent allocation mode (step 1035). If it is determined that mobile station 200 should enter persistent allocation mode, then base station 102 allocates the downlink and uplink traffic to the mobile station in a way that further preserves the battery life (step 1040).

For example, in one embodiment, base station 102 may try to schedule the downlink traffic in one subframe, if appropriate, rather than over several subframes so that mobile station 200 can decode the data at one time. As another example, base station 102 may allocate to mobile station 200 periodically, if appropriate, so that mobile station 200 only has to monitor a certain number of subframes. This is an advantage over prior art allocation methods.

Note that in the prior art (see, e.g., the 1136r2 reference), a mobile station must monitor each downlink subframe for any possible Basic Assignment A-MAP IE, even if the mobile station is already allocated a persistent resource by an Individual or Composite Persistent Allocation A-MAP IE.

In embodiments of the present disclosure, if mobile station 200 is allocated a persistent resource, then mobile station 200 may monitor the downlink transmission only periodically without monitoring all the subframes. If there is HARQ retransmission, then mobile station 200 may need to monitor additional subframes for Basic Assignment A-MAP based on the context of the HARQ retransmission. Base station 102 may instruct mobile station 200 to use synchronized HARQ re-transmission for both downlink and uplink when mobile station 200 is in power preservation mode so that mobile station 200 does not have to monitor all downlink subframes for Basic Assignment A-MAP in searching for downlink retransmission allocation. In synchronized HARQ mode, the retransmission will happen in predetermined locations.

Figure 11:
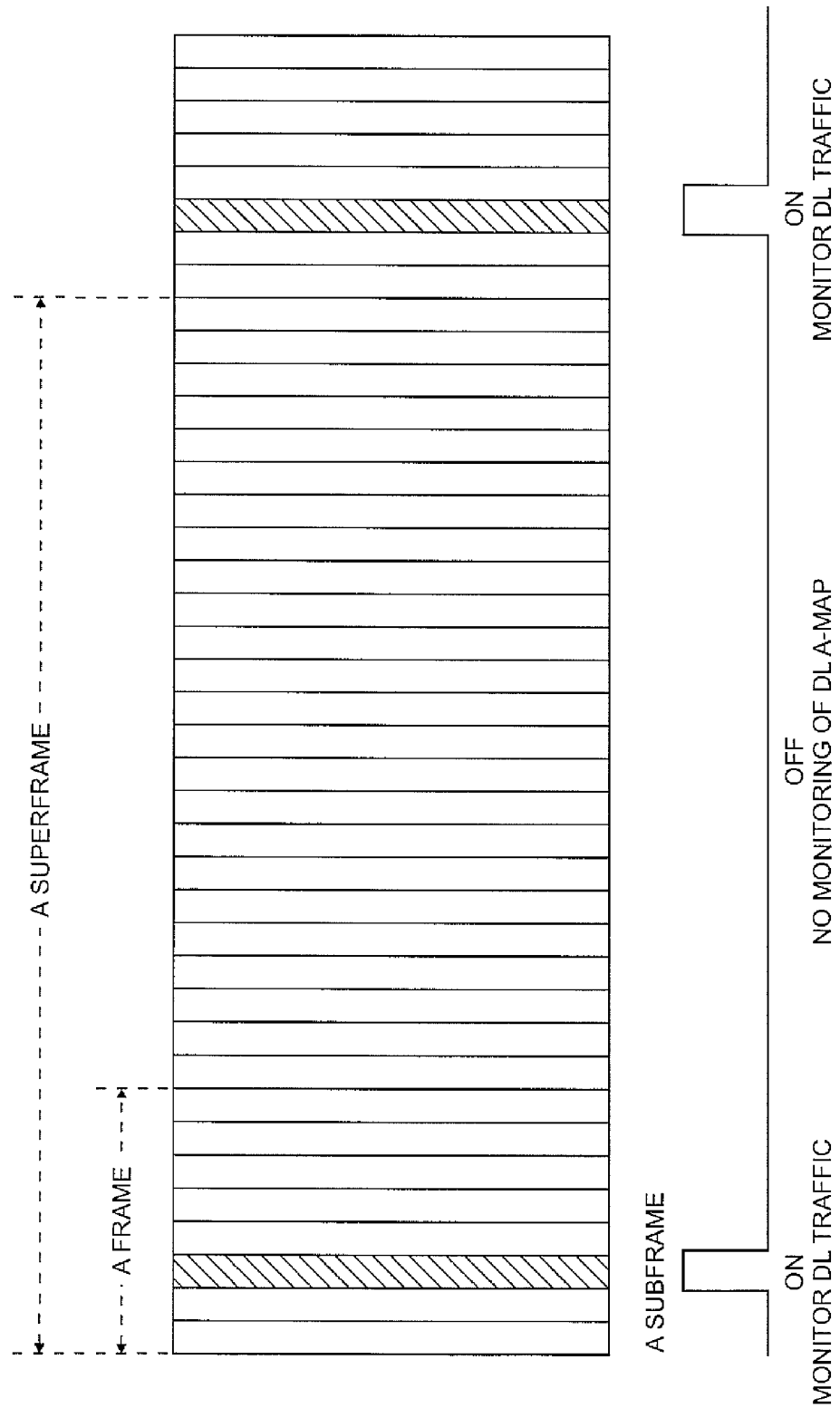
FIG. 11 illustrates a use of persistent resource allocation, according to one embodiment of the present disclosure.

FIG. 11 illustrates a use of persistent resource allocation, according to one embodiment of the present disclosure. FIG. 11 shows a transmission period divided into subframes. Lines indicating a frame and a superframe are also shown. As depicted in FIG. 11, mobile station 200 wakes up periodically and monitors only a few subframes in each period (e.g., monitors one subframe per superframe). No monitoring takes place during the other subframes, so that battery life may be further preserved.

Preservation methods for use with uplink traffic are also provided. For example, in certain embodiments, in order to reduce the power consumption for mobile station 200 to transmit uplink traffic, base station 102 may form a receiving beam pointing to mobile station 200. This permits mobile station 200 to send a signal using reduced transmission power. If there is a relay station near mobile station 200, then base station 102 could request the relay station to relay the mobile station uplink traffic to further reduce the uplink transmission power of mobile station 200.

Returning now to step 1035, if it is determined that mobile station 200 should not enter persistent allocation mode, then base station 102 may try to preserve the battery life of mobile station 200 by scheduling and/or other means (step 1045).

Figure 12:
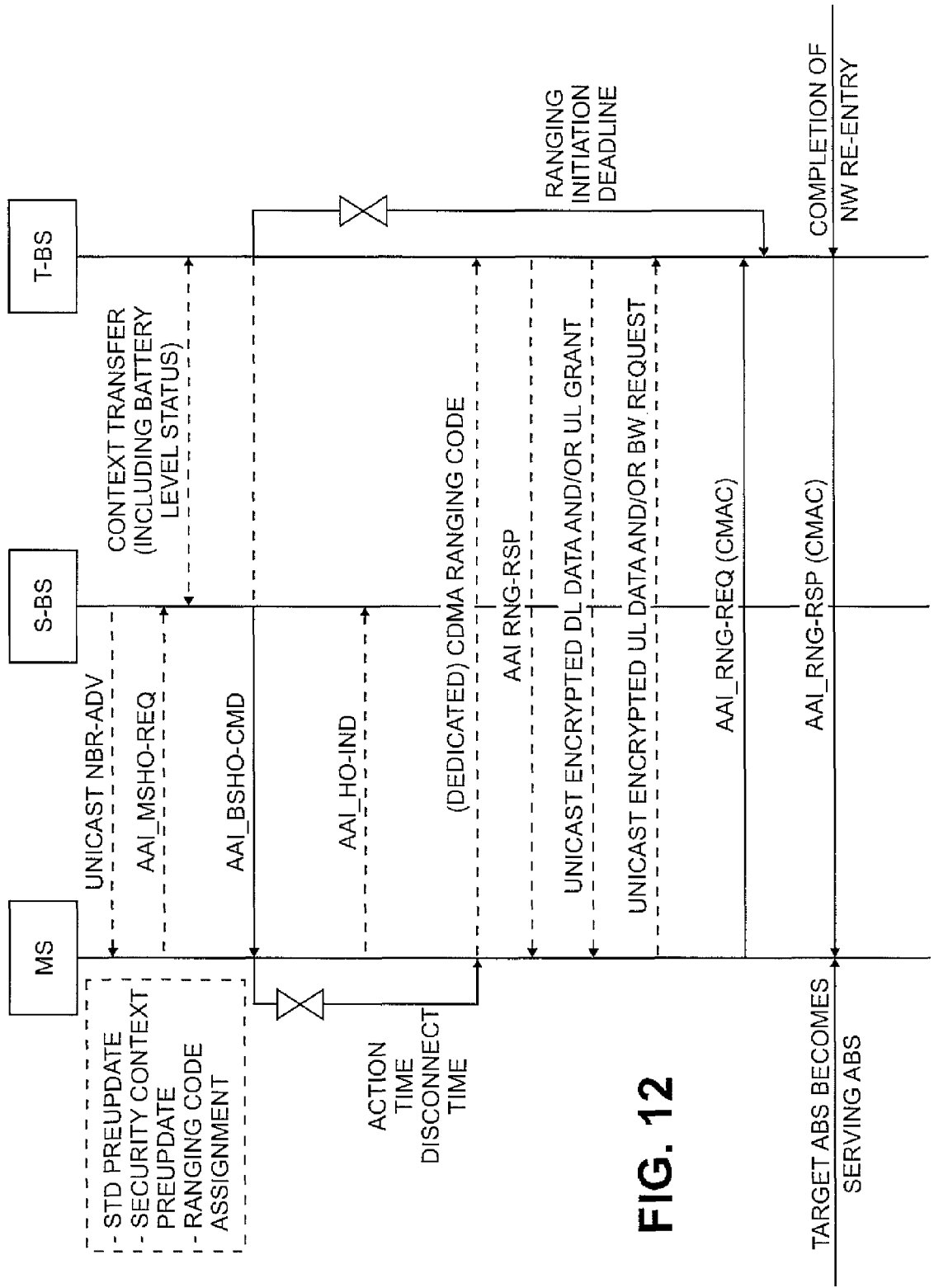
FIG. 12 depicts a handover procedure that preserves power consumption if a mobile station has sent a battery report, according to one embodiment of the present disclosure.

FIG. 12 depicts a handover procedure that preserves power consumption if a mobile station has sent a battery report, according to one embodiment of the present disclosure. As depicted in FIG. 12, a serving base station (S-BS) may unicast the neighbor cell list information (NBR-ADV) to the mobile station (MS). Thus, the mobile station does not have to search and wait for the standard neighbor cell list that the serving base station periodically broadcasts to all regular mobile stations.

In the handover preparation stage, the serving base station informs the target base station (T-BS) about the battery level of the mobile station, so that the target base station can continue battery preservation methods once the mobile station is handed over into its cell. The mobile station is not required to send the battery report again, because the report information is exchanged between the serving base station and target base station over the backhaul. In certain embodiments, the target base station and the serving base station may expedite the handover period to further reduce the mobile station power consumption. For example, the target base station may assign a dedicated ranging code and a dedicated ranging resource so that the mobile station could reach the target base station without interference or contention from other regular mobile stations.

Figure 13:
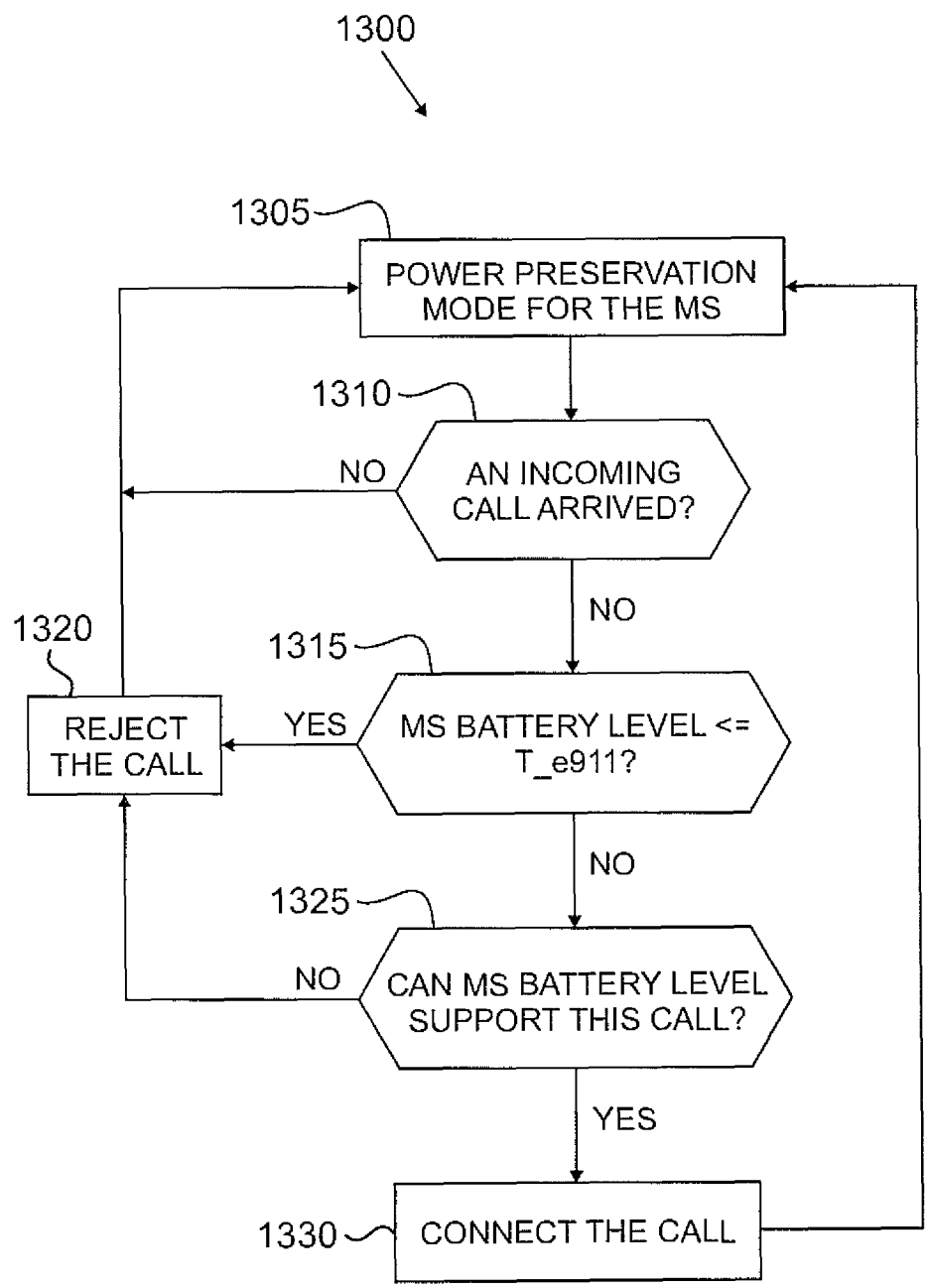
FIG. 13 depicts a flow chart illustrating a method for maintaining battery power for an emergency call, according to one embodiment of the present disclosure.

FIG. 13 depicts a flow chart illustrating a method for maintaining battery power for an emergency call (e.g., E-911), according to one embodiment of the present disclosure. Method 1300 provides call admission control at the base station (e.g., base station 102) and core network for a mobile station (e.g., mobile station 200) that has previously sent a battery report.

Base station 102 may help mobile station 200 maintain a minimum power level for making at least one emergency call. For example, a three-minute E-911 call may need T_e911 battery level. In certain embodiments, any combination of base station 102, the network, and mobile station 200 may reject other traffic if mobile station 200 reports a battery level not greater than T_e911. After the reporting, mobile station 200 is not required to maintain connection with any base station to avoid any power consumption. When mobile station 200 needs to make an emergency call, the remaining battery level is enough for mobile station 200 to acquire synchronization with the network and make the call.

Method 1300 starts with mobile station 200 in power preservation mode (step 1305). It is determined if an incoming call has arrived at mobile station 200 (step 1310). If no incoming call has arrived, mobile station 200 maintains power preservation mode. However, if an incoming call arrives at mobile station 200, then mobile station 200 checks to see if the battery level is less than or equal to a threshold for emergency calls (e.g., T_e911) (step 1315). If the battery level is less than or equal to T_e911, then the call is rejected (step 1320). However, if the battery level is greater than T_e911, then it is determined if the battery level is sufficient to support the incoming call (step 1325). If it is determined that the battery level cannot support the call, then the call is rejected (step 1320). If it is determined that the battery level can support the call, then the call is connected (step 1330).

Other embodiments of method 1300 are possible. Specifically, assume mobile station 200 is having an ongoing call with base station 102. If mobile station 200 sends a battery report showing that the mobile station battery level is equal or below the threshold for supporting an emergency call (e.g., T_e911), then base station 102 and/or the core network should halt the call upon receiving the battery report. This may ensure that mobile station 200 has enough remaining battery power to make an emergency call when needed.

Other embodiments similar to method 1300 are possible. For example, call admission control may be performed by the base station and network at thresholds other than the threshold for an emergency call (e.g., T_e911). Base station 102 and/or the core network may specify a series of thresholds so that base station 102, the network, and/or mobile station 200 know when to reject a certain application or call if the battery level is below the threshold set for that kind of application.

For example, in one embodiment, if mobile station 200 has reported a battery level below a certain threshold for commercials, then base station 102 or the network may block any commercials that might be permissible for other mobile stations having sufficient battery power. As another example, if mobile station 200 has reported a battery level below a certain threshold for internet traffic, then base station 102 or the network may block any internet traffic that might be permissible for other mobile stations having sufficient battery power.

The methods and systems disclosed herein provide a number of advantages over the prior art. The disclosed methods allow the mobile station to report not only battery level, but also device type, so that the base station can make a better decision on how to adjust its operations in order to preserve the battery life for the mobile station. The disclosed methods also provide the mobile station with cognitive ability to determine its device type and status in real-type operation scenario.

Methods are also disclosed for the base station and the mobile station to report, cancel, and monitor the battery report systematically, so that fair service may be provided to all mobile stations. These methods also provide numerous enhancements to the base station to help preserve the mobile station battery life using enhanced features with active mode, sleep mode, idle mode, handover, etc.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile station capable of accessing a wireless communication network comprising a plurality of base stations, the mobile station comprising processing circuitry configured to:
    determine if a battery level of the mobile station is below a selected one of a plurality of power level thresholds;
    upon a determination that the battery level is below the selected power level threshold, send a battery report describing the battery level is below the selected power level threshold to a first base station of the wireless communication network, and enter a battery power preservation mode;
    in case of handover being triggered, conduct the handover from the first station to a second base station, maintaining the battery power preservation mode;
    determine if the battery level of the mobile station rises to the selected power level threshold;
    upon a determination that the battery level of the mobile station rises to the selected power level threshold, send a cancellation message cancelling the battery report to either the first base station or the second base station if the handover has been conducted, and exit the battery power preservation mode; and
    upon receiving a denial of entering the battery power preservation mode from the base station, refrain from entering the power reservation mode.

2. The mobile station as set forth in claim 1, wherein the plurality of power level thresholds comprises a data threshold, a video threshold, and a voice threshold.

3. The mobile station as set forth in claim 1, wherein the battery report comprises a request to enter the battery power preservation mode.

4. The mobile station as set forth in claim 1, wherein the battery power preservation mode is an enhanced idle mode having a paging cycle, wherein an available interval in the paging cycle is set to a minimum value.

5. The mobile station as set forth in claim 1, wherein the battery power preservation mode is an enhanced sleep mode having a sleep cycle, wherein a listening interval in the sleep mode is set a minimum value.

6. The mobile station as set forth in claim 1, wherein the battery power preservation mode is a persistent allocation mode, wherein each time period in a plurality of time periods is divided into a plurality of downlink subframes, and only a selected number of downlink subframes are monitored in each time period.

7. The mobile station as set forth in claim 5, wherein the mobile station is further configured to start from an initial sleep cycle length upon entering the enhanced sleep mode and increase a length of the sleep cycle when no traffic occurs until a maximum sleep cycle length is reached.

8. The mobile station as set forth in claim 1, wherein when the mobile station is in the battery power preservation mode, the mobile station is further configured to:
    determine if the battery level is below a second threshold; and
    upon a determination that the battery level is below the second threshold, send a second battery report to the first base station, the second battery report comprising a request for additional battery preservation services in the battery power preservation mode.

9. A base station in a wireless communication network, the base station capable of communicating with a plurality of mobile stations, the base station comprising processing circuitry configured to:
    receive a battery report describing a battery level is below a selected power level threshold from a first of the mobile stations;
    determine if the first mobile station is eligible to enter a battery power preservation mode;
    upon a determination that the first mobile station is eligible to enter the battery power preservation mode, enter the battery power preservation mode for the first mobile station;
    transmit information associated with the battery report to a target base station in case of a handover of the mobile station from the base station to the target base station;
    receive a cancellation message canceling the battery report from the first of the mobile stations;
    determine if the first mobile station is eligible to exit the battery power preservation mode; and
    determine that the first mobile station abused a previous battery power preservation mode, and deny the request to enter the battery power preservation mode.

10. The base station as set forth in claim 9, wherein the plurality of power level thresholds comprises a data threshold, a video threshold, and a voice threshold.

11. The base station as set forth in claim 9, wherein the battery report comprises a request to enter the battery power preservation mode.

12. The base station as set forth in claim 9, wherein the battery power preservation mode is an enhanced idle mode having a paging cycle, wherein an available interval in the paging cycle is set to a minimum value.

13. The base station as set forth in claim 9, wherein the battery power preservation mode is an enhanced sleep mode having a sleep cycle, wherein a listening interval in the sleep mode is set a minimum value.

14. The base station as set forth in claim 9, wherein the battery power preservation mode is a persistent allocation mode, wherein each time period in a plurality of time periods is divided into a plurality of downlink subframes, and only a selected number of downlink subframes are monitored in each time period.

15. The base station as set forth in claim 13, wherein the base station is further configured to start from an initial sleep cycle length upon entering the enhanced sleep mode and increase a length of the sleep cycle when no traffic occurs until a maximum sleep cycle length is reached.

16. The base station as set forth in claim 9, the base station further configured to:
transmit information associated with the battery report to a target base station before a handover of the mobile station from the base station to the target base station.

17. A wireless communication network comprising a plurality of base stations, each base station capable of communicating with a plurality of mobile stations, each base station comprising processing circuitry configured to:
receive a battery report from a first of the mobile stations;
determine if the first mobile station is eligible to enter a battery power preservation mode;
upon a determination that the first mobile station is eligible to enter the battery power preservation mode, enter the battery power preservation mode for the first mobile station;
transmit information associated with the battery report to a target base station in case of a handover of the mobile station from the base station to the target base station;
receive a cancellation message cancelling the battery report from the first of the mobile stations;
determine if the first mobile station is eligible to exit the battery power preservation mode; and
determine that the first mobile station abused a previous battery power preservation mode, and deny the request to enter the battery power preservation mode.

18. The wireless communication network as set forth in claim 17, wherein the plurality of power level thresholds comprises a data threshold, a video threshold, and a voice threshold.

19. The wireless communication network as set forth in claim 17, wherein the battery power preservation mode is an enhanced idle mode having a paging cycle, wherein an available interval in the paging cycle is set to a minimum value.

20. The wireless communication network as set forth in claim 17, wherein the battery power preservation mode is an enhanced sleep mode having a sleep cycle, wherein a listening interval in the sleep mode is set a minimum value.

21. The wireless communication network as set forth in claim 17, wherein the battery power preservation mode is a persistent allocation mode, wherein each time period in a plurality of time periods is divided into a plurality of downlink subframes, and only a selected number of downlink subframes are monitored in each time period.

* * * * *